United States Patent Office 3,267,711
Patented August 23, 1966

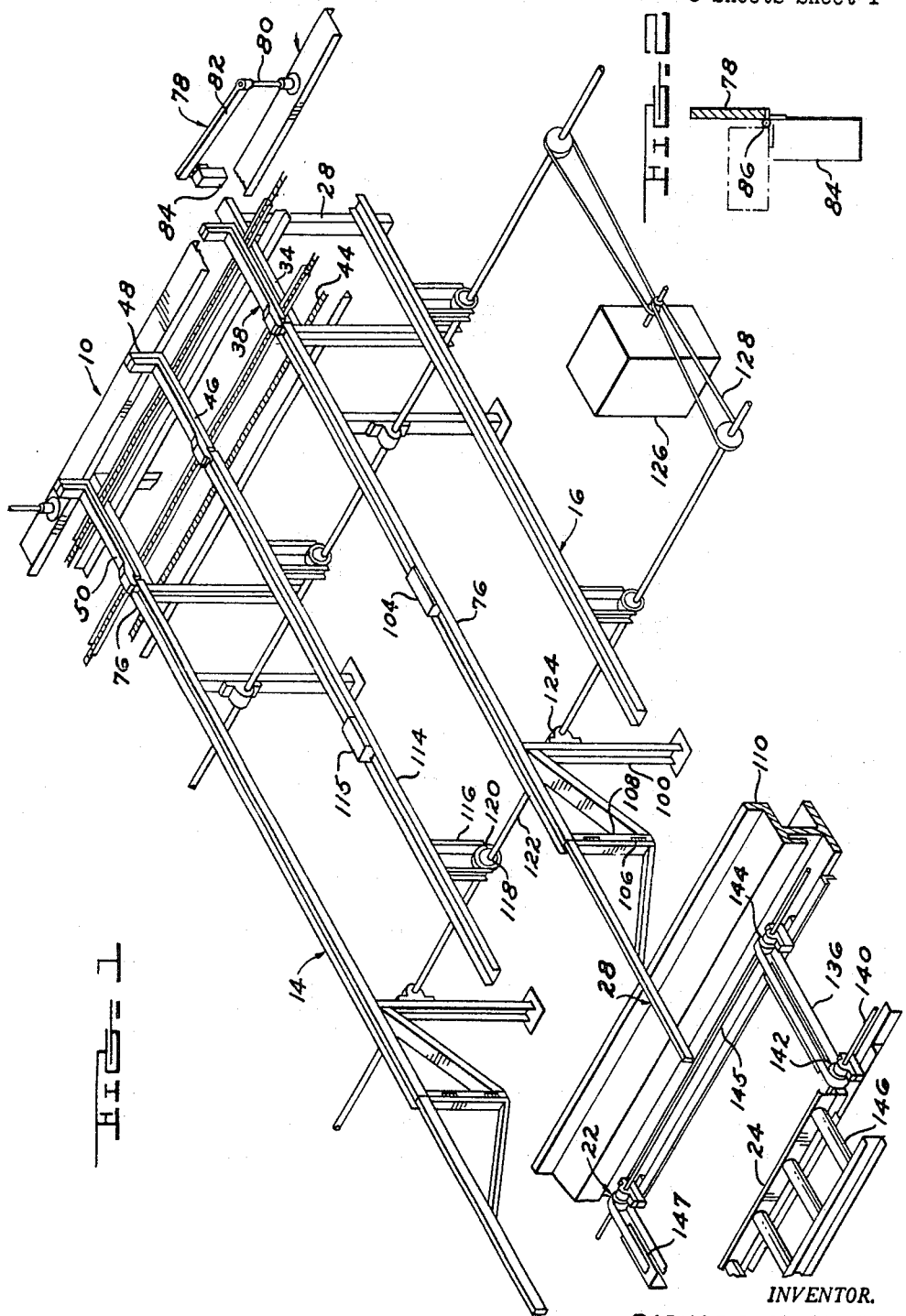

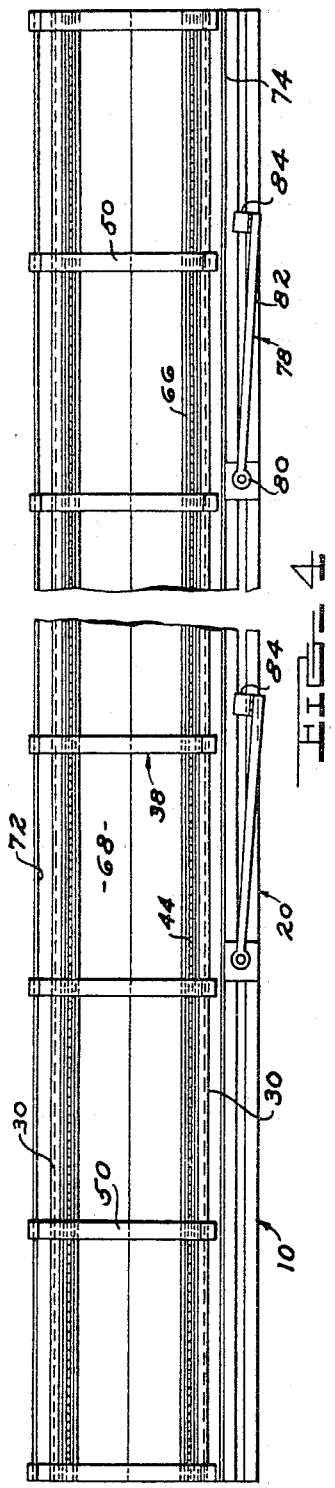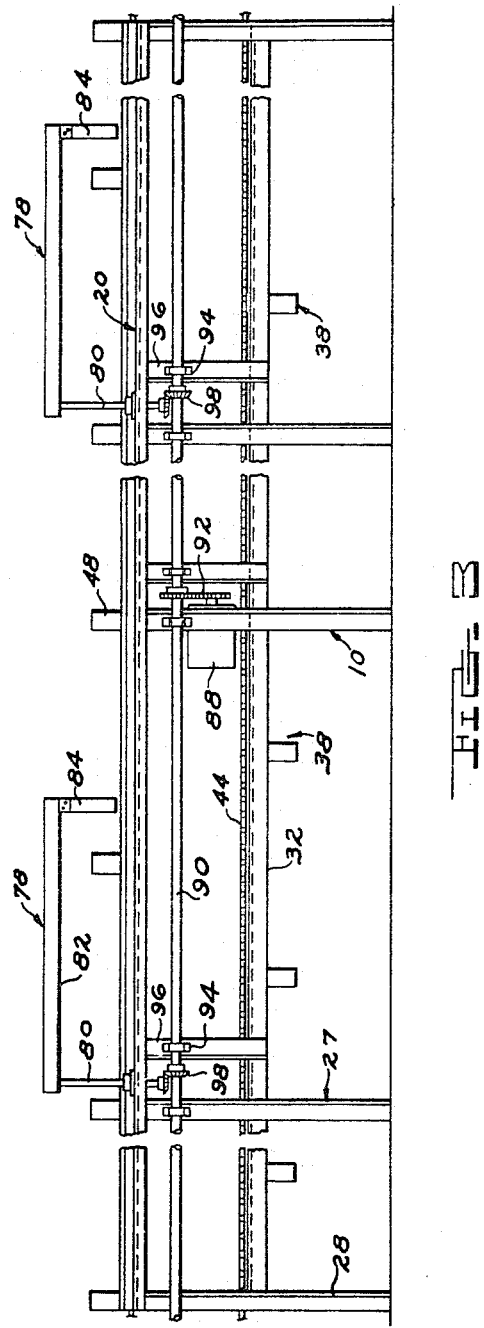

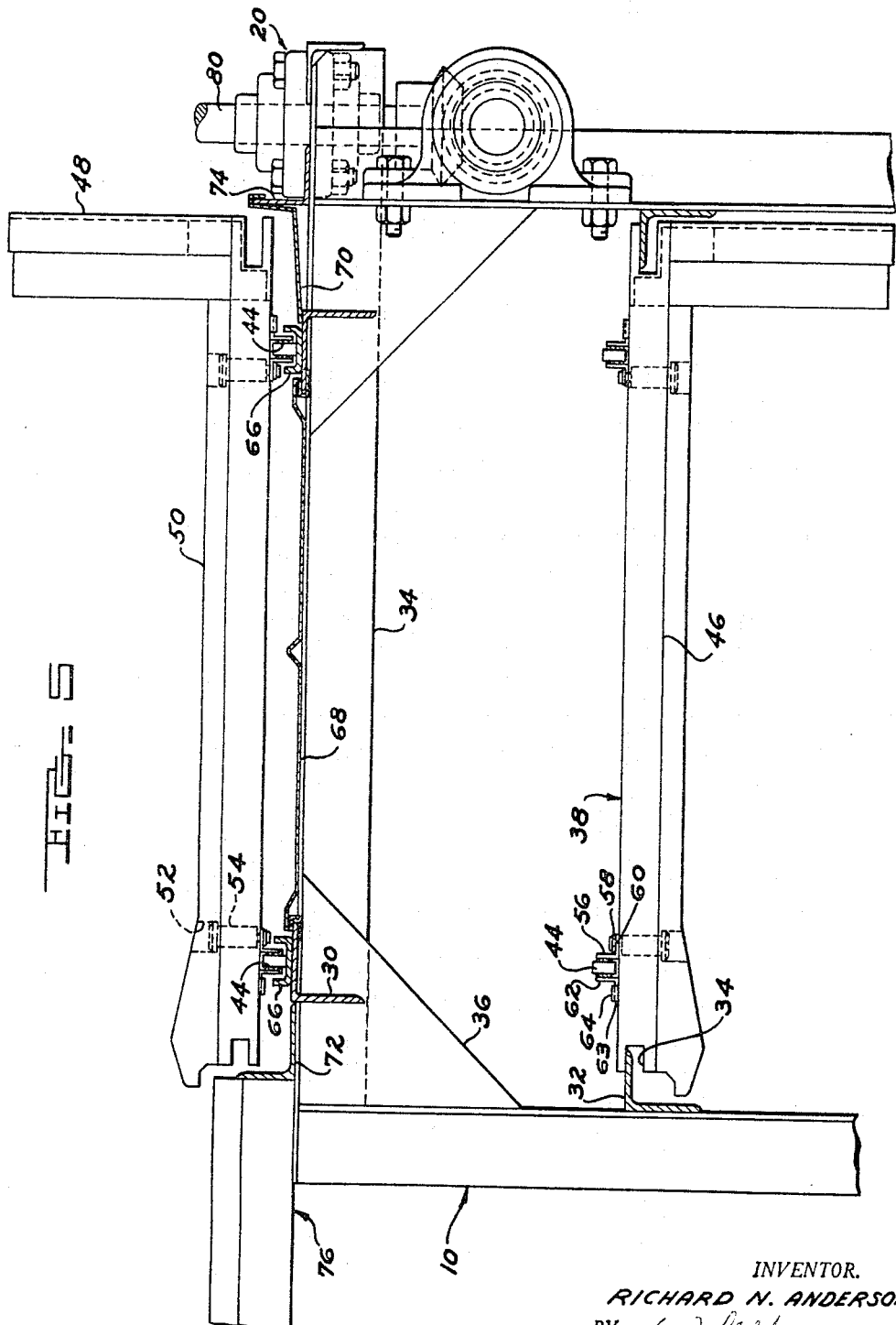

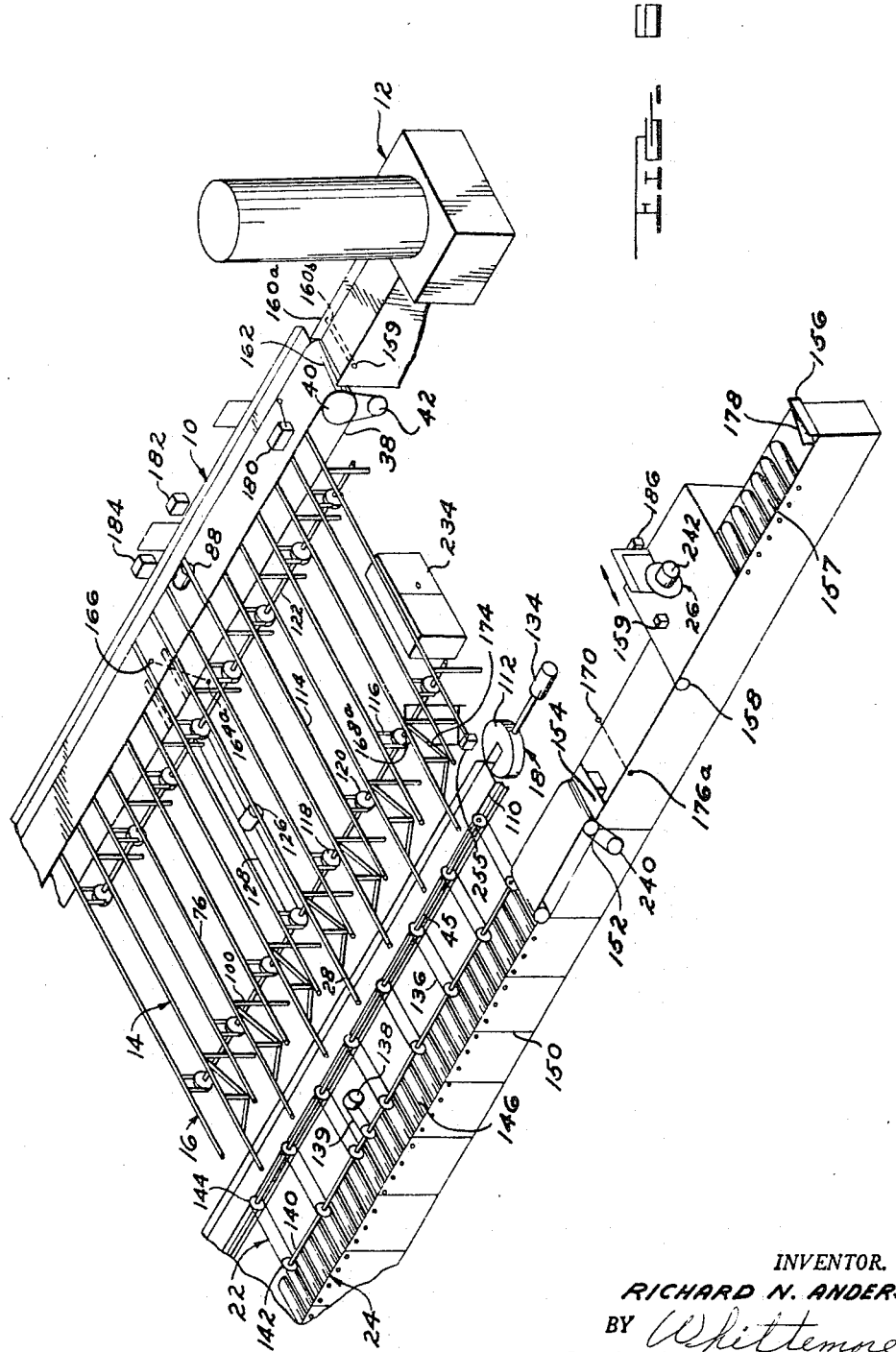

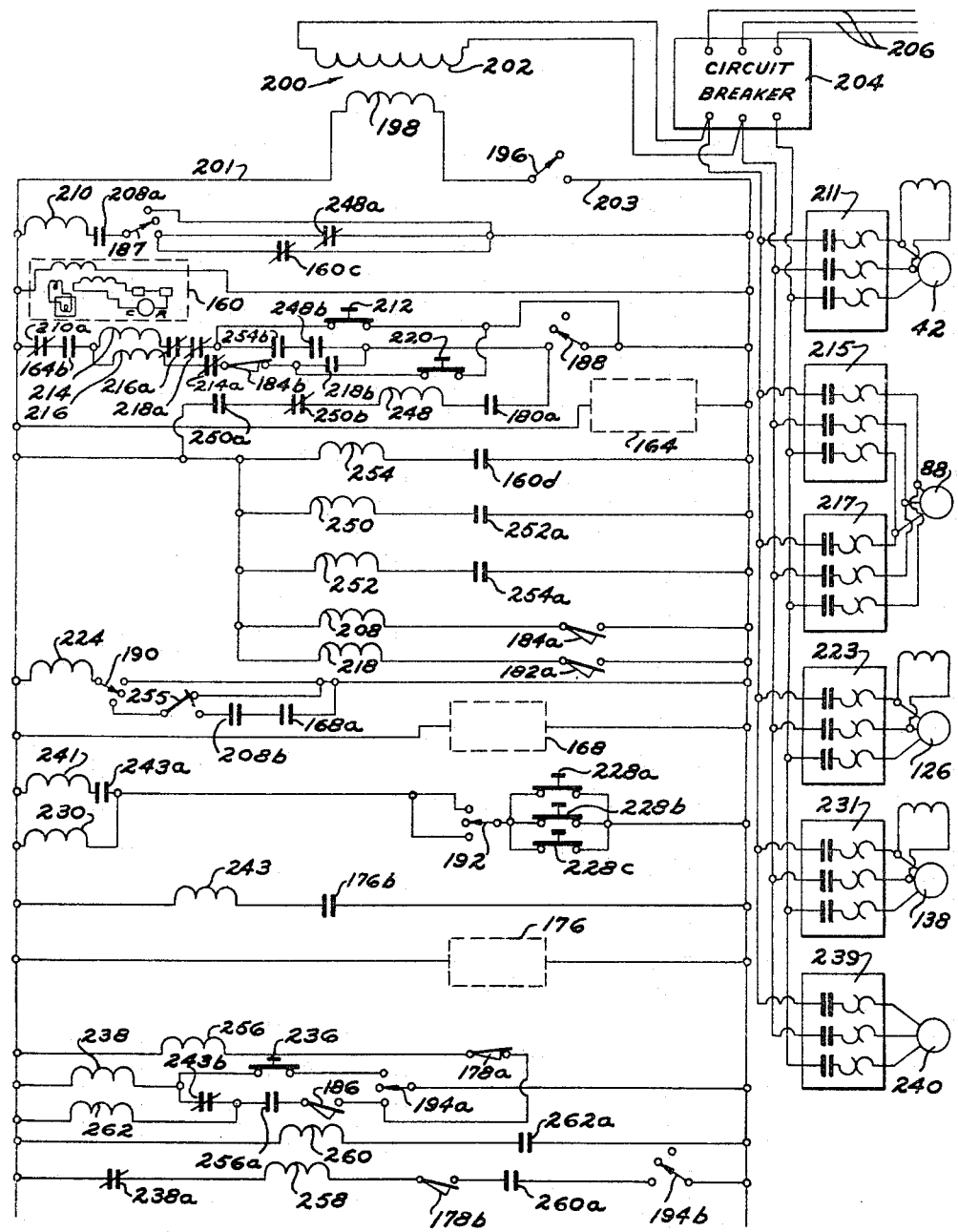

3,267,711
AUTOMATIC EXTRUSION HANDLING
EQUIPMENT
Richard N. Anderson, Rome, Ga., assignor to V. E. Anderson Mfg. Co., Owensboro, Ky., a corporation of Kentucky
Original application Sept. 5, 1961, Ser. No. 136,080, now Patent No. 3,157,268, dated Nov. 17, 1964. Divided and this application Apr. 1, 1963, Ser. No. 269,404
14 Claims. (Cl. 72—254)

The invention relates to automatic extrusion handling equipment and refers more specifically to apparatus for transferring extrusions from an extrusion press over a runout table and cooling rack to an extrusion stretcher and for transferring the extrusions from the stretcher onto a saw conveyor into position for sawing the extrusions into predetermined lengths and electric controls therefor for operating the apparatus in either manual or automatic modes.

The application is a divisional application of Serial No. 136,080, filed September 5, 1961, now Patent No. 3,157,268.

In the past, the handling of extrusions between an extrusion press and a saw for cutting the extrusions to required lengths has been accomplished through the use of a usual crew of seven to nine workmen. In such manual handling of extrusions a great deal of scrap is produced due to scarring and twisting particularly of the hot extrusions. In addition, with the high cost of labor the manual handling of extrusions adds greatly to the expense thereof.

Moreover, the quality of the extrusions produced with manual handling may vary considerably due to the human factor in the runout of the hot extrusions. Thus the pressure applied to the extrusions will vary with the individual runout men and may differ with the same runout man depending on his fatigue condition.

It is therefore one of the objects of the present invention to provide improved automatic extrusion handling equipment.

Another object is to provide equipment for automatically transferring extrusions between an extrusion press and a saw comprising a runout table, a cooling rack positioned adjacent the stretching apparatus for transferring transferring the extrusions between the runout table and cooling rack, walking beam apparatus for transferring the extrusions on the cooling rack away from the runout table, an extrusion stretcher for stretching the extrusions from the walking beam apparatus, a transverse conveyor positioned adjacent the stretching apparatus for transferring the stretched extrusions to a saw conveyor, a saw conveyor for advancing the extrusions intermittently into position to be sawed ino predetermined lengths, a saw for sawing the extrusions on said saw conveyor into the predetermined lengths and electric controls for automatically sequencing the movement of the equipment.

Another object is to provide equipment for transferring extrusions between an extrusion stretcher and a saw comprising a transverse conveyor for automatically loading extrusions on a saw conveyor, a saw conveyor for advancing extrusions intermittently into positions to be sawed into predetermined lengths and electric controls for automatically sequencing the operation of the saw conveyor.

Another object is to provide automatic extrusion transferring equipment as set forth above wherein the controls include means for sensing the end of an extrusion extruded onto the runout table.

Another object is to provide automatic extrusion handling equipment as set forth above wherein the controls include means for preventing the runout conveyor from stopping in other than predetermined positions with respect to the means for transferring the extrtusions from the runout conveyor to the cooling rack.

Another object is to provide automatic extrusion handling equipment as set forth above wherein the controls include means for sensing the relative position between the runout conveyor and means for transferring the extrusions and for preventing operation of the means for transferring extrusions with the runout conveyor in other than a predetermined position in relation to the means for transferring extrusions.

Another object is to provide extrusion handling equipment as set forth above wherein the controls include means for stopping the walking beam apparatus only in a down position and for actuating the walking beam apparatus only when the means for transferring extrusions is not in position over the conveyor and an extrusion is not prosent at the stretcher side of the cooling rack.

Another object is to provide extrusion handling equipment as set forth above wherein the controls include means for preventing feeding of a second group of extrusions on the saw conveyor to the saw after the sensing of the end of a first group of extrusions on the saw conveyor until the first group of extrusions are removed therefrom.

Another object is to provide extrusion handling apparatus as set forth above wherein the controls include means for preventing operation of the saw until extrusions are positioned firmly against the end of the saw conveyor.

Another object is to provide automatic extrusion handling equipment as set forth above wherein the transverse conveyor comprises a pair of elongated, transversely spaced apart rods positioned at one side of the saw conveyor having aligned belt pulleys thereon, endless belts extending between the rods mounted on the belt pulleys and means for rotating one of the rods.

Another object is to provide material handling apparatus as set forth above wherein the saw conveyor comprises a plurality of parallel, rotatably mounted spaced apart rollers extending transversely of the conveyor, an endless belt of high friction material positioned centrally of the conveyor, means for driving the endless belt and structure for selectively raising extrusions on the saw conveyor off of the endless belt.

Another object is to provide improved automatic extrusion handling equipment which is simple in construction, economical to manufacture and efficient in use.

Other objects and features of the invention will become apparent as the description proceeds, especially when taken in conjunction with the accompanying drawings, illustrating a preferred embodiment of the invention wherein:

FIGURE 1 is a perspective diagrammatic illustration of a section of the automatic extrusion handling equipment of the invention.

FIGURE 2 is a detail of an extrusion contacting carbon block of one of the kickover arms of the automatic extrusion handling equipment illustrated in FIGURE 1.

FIGURE 3 is a broken longitudinal elevation of the runout table of the automatic extrusion handling equipment illustrated in FIGURE 1.

FIGURE 4 is a broken top view of the runout table of the automatic extrusion handling equipment illustrated in FIGURE 1.

FIGURE 5 is an enlarged transverse section of the runout conveyor portion of the runout table of the automatic extrusion handling equipment shown in FIGURE 1.

FIGURE 6 is a diagrammatic perspective illustration of the automatic extrusion handling equipment of the invention particularly illustrating the positioning of the sensing units of the electric control circuit.

FIGURE 7 is a schematic diagram of the electric control circuit of the automatic extrusion handling equipment illustrated in FIGURES 1–6.

With particular reference to the drawings, one embodiment of the present invention will now be disclosed.

As best shown in FIGURES 1 and 6, the automatic extrusion handling equipment comprises the runout table 10 including an endless conveyor for receiving extrusions from the extrusion press 12, cooling rack 14 for receiving extrusions from the runout table 10, walking beam apparatus 16 associated with the cooling rack 14 for transferring extrusions deposited thereon from a position adjacent the runout table 10 to a position adjacent the extrusion stretcher 18, and the kickover apparatus 20 for transferring extrusions from the runout table 10 to the cooling rack 14. The transverse conveyor 22 for transferring extrusions from the extrusion stretcher 18 to saw conveyor 24, and the saw conveyor 24 by which the extrusions are positioned for cutting by saw 26 are also included in the automatic extrusion handling equipment of the invention. Extrusion stretcher 18 is provided between the cooling rack 14 and transverse conveyor 22 to stretch and thus straighten warped and bent extrusions and to work harden the extrusions by elongation thereof.

The automatic extrusion handling equipment also includes the sensing photoelectric cells and microswitches illustrated in position on the equipment in FIGURE 6 and the associated electric control circuit 23 of FIGURE 7. The electric control circuit 23 of FIGURE 7 is operable to control the automatic transfer of extrusions from extrusion press 12 to the extrusion stretcher 18 and from the stretcher 18 into position for cutting by saw 26.

More specifically, the runout table 10 as best shown in FIGURES 3–5 comprises a structural frame 27 including vertical supports 28, upper and lower longitudinal braces 30 and 32 respectively, and transverse braces 34 supported at the ends from vertical supports 28 by plates 36. The runout table 10 further includes the runout conveyor 38 which is mounted on sprockets 40 positioned at opposite ends of the conveyor. Sprockets 40 are driven by a motor 42 positioned at one end of the conveyor.

Runout conveyor 38 includes matching endless chains 44 at each side thereof as shown best in FIGURE 5 which are in driven engagement with sprockets 40. At spaced intervals along the chains 44 channel members 46 extending transversely of the runout conveyor 38 are secured to the chains 44. Similar channel members 48 extending at right angles and secured to the channel members 46 on the side of the runout conveyor 38 away from the cooling rack 14 are provided as best shown in FIGURE 5. Both of the channels 46 and 48 are lined with carbon blocks 50.

Carbon blocks 50 are secured to channels 46 by means of a counterbored recess 52 in the carbon blocks in which a headed pin 54 is positioned. The pin 54 extends entirely through the carbon block 50, the channel 46 and bracket 56 which bracket is secured to one side of a link of the chain 44. The pin 54 is secured in position by a clip 58 fitting within the annular recess 60 on the end thereof. Chain 44 is further secured to the channel 46 by means of the bracket 62 secured to the opposite side of the same link of the chain 44 as the bracket 56 which bracket 62 is inserted within an opening 63 provided by a U-shaped bar 64 secured to the channel 46. Thus in operation the carbon block 50, channels 46 and chains 44 are maintained in more secure connection despite substantial vibration thereof as compared with the previously used bolted connections which required much maintenance due to loosening through vibration of runout conveyor 38.

As indicated best in FIGURE 5, the chains 44 are supported on the top of the conveyor belt 38 by means of the channels 66 secured to the top of the braces 30. Closing panels 68 are also provided extending between the longitudinal braces 30 to prevent the end of an extrusion from possibly contacting the transverse brace 34 and halting the runout of the extrusion. Flashing 70 and longitudinally extending angles 72 and 74 are further provided on the runout table 10 to close the channel in which the runout conveyor 38 moves on top of the table.

As best shown in FIGURE 5, the ends of the horizontal beams 76 of the cooling rack 14 may be abutted against the longitudinally extending angle 72 of the runout table.

The bottom of the runout conveyor 38 is supported at the sides thereof by the longitudinally extending braces 32 which extend into notches 34 cut in the ends of the channels 46. Thus both the top and bottom of the runout conveyor 38 is prevented from sagging in operation.

The kickover arm apparatus of the invention which is operable to transfer extrusions from the runout table 10 to the cooling rack 14 is best shown in FIGURES 2 and 3. The kickover arm apparatus 20 comprises the kickover arms 78 including the rotatable vertical shaft 80, the horizontally extending arm 82 and the extrusion contacting carbon block 84. As shown in FIGURE 2 the extrusion contacting carbon block 84 is mounted on hinge 86 whereby the carbon block 84 is permitted to pivot in only one direction.

Thus, in operation it is essential that the runout conveyor be stopped within a predetermined safe zone to prevent the carbon blocks 84 from engaging the upstanding channel portions 48 of the runout conveyor during transfer of extrusions from the runout table 10 to the cooling rack 14. If during the transfer of the extrusions from the runout table 10 to the cooling rack 14 a carbon block 84 of one of the kickover arm apparatus 20 gets in front of an extrusion due to stopping of the extrusion a short distance from the carbon block and bending of the end of the extrusion toward the carbon block, the carbon block will pivot into the dotted line position shown in FIGURE 2 to prevent dragging of the extrusion back onto the runout conveyor on reverse movement of the kickover arm apparatus.

The kickover arm apparatus 20 of the invention further includes motor 88 drivingly engaged with shaft 90 by drive means 92 which shaft 90 is rotatably mounted in bearings 94 secured to vertical structural members 96 of the runout table frame 27. The shaft 90 is coupled to the lower end of the shafts 80 by means of bevel gears 98 so that on actuation of motor 88 the shaft 90 is caused to rotate and will in turn therefore rotate shaft 80 to swing the horizontal arms 82 of the kickover arms 78 and the carbon blocks 84 secured thereto in an arcuate path outward over the runout conveyor 38 or back again to the position shown in FIGURE 1 depending on the direction of rotation of motor 88. During outward swinging movement of the kickover arm apparatus 20 any extrusion on the runout conveyor 38 will be pushed from the conveyor 38 onto the cooling rack 14.

Cooling rack 14 as best shown in FIGURE 1 includes the vertical supports 100 and the horizontal beam, channel members 76 supported thereon in which carbon blocks 104 are secured along which extrusions are moved by the stepping beam apparatus 16. The cooling rack 14 is provided with swinging cross arms 28 attached to supports 108 and beams 76 at the side of the cooling rack opposite the runout table 10 which are secured by hinges 106 to the structural supports 108 as shown best in FIGURE 1. The swinging cross arms 28 extend over the stretcher beam 110 between the cooling rack 14 and the transverse conveyor 22. Thus an operator in moving the rear clamping head (not shown) of the extrusion stretcher 18 along the stretcher beam 110 so that the stretcher 18 may accommodate different lengths of extrusion may move the rear clamping head of the stretcher toward or away from the front clamping head 112 without the previous necessity of removing sliding extensions of horizontal beams 76 and replacing the same.

Walking beam appartus 16 as shown best in FIGURE 1 includes the horizontal channel members 114 extending parallel to and positioned between the horizontal beams 76 of the cooling rack 14. The horizontal channels 114 are supported by vertically extending channels 116 secured to cylindrical bearing sleeves 118. Mounted within the cylindrical bearing sleeves 118 is a cylinder 120 eccentrically secured to shaft 122 for rotation therewith. Shaft 122 is supported by bearing blocks 124 secured to the vertical members 100 of the cooling rack 14. Shafts 124 are rotated by motor means 126 through drive means 128 best shown in FIGURE 1.

In operation as the shafts 122 are rotated the eccentric cylinders 120 cause the vertical channels 116 and the walking beams 114 to traverse a circular path wherein the tops of the carbon blocks 115 secured to channel members 114 are above the tops of the carbon blocks 104 secured to horizontal beams 76 during half of the circular movement thereof wherein the members 114 are moving away from the runout table. Thus the walking beams 114 intermittently engage extrusions resting on the cooling rack 14 to advance them from the runout table side of the cooling rack 14 to the transverse conveyor side thereof.

Extrusion stretcher 18, as shown best in FIGURE 6, is positioned beneath the swinging cross arms 28 and between the cooling rack 14 and the transverse conveyor 22. Extrusion stretchers such as 18 are known in the art and will not therefore be considered in detail at this time. Briefly the stretcher 18 includes a pair of similar clamping heads, one of which is shown in FIGURE 6, secured to opposite ends of a stretcher beam 110. Stretcher beam 110 is provided to maintain the front clamping head 112 and a similar rear clamping head (not shown) in a predetermined spaced apart relation during application of substantial tension forces to an extrusion secured in the clamping heads.

The tension forces are provided on extrusions secured in clamping heads at opposite ends of the stretcher beam 110 by convenient means, such as the fluid actuated cylinder 134 shown positioned on the stretcher beam 110 and operable in conjunction with front clamping head 112. The rear head is movable longitudinally of stretcher beam 110 to accommodate different lengths of extrusions to be stretched. Stretching of the extrusions removes irregularities such as twists and warping of the extrusions formed as they are produced by press 12 and work hardens the metal extrusions through elongation thereof.

After the extrusions have been stretched by extrusion stretcher 18 they are positioned on the transverse conveyor 22 for movement thereby to the saw conveyor 24. Transverse conveyor 22 comprises a plurality of individual parallel spaced apart conveyor belts 136 driven by motor 138 through drive belt 139 and a common drive shaft 140. The individual end sprockets 142 of the transverse conveyor belts 136 are rigidly secured to the drive shaft 140 for rotation therewith. End sprockets 144 of conveyor belts 136 are mounted on common shaft 145 for rotation. The upper portion of conveyor belts 136 are supported centrally by structural members 147 as shown best in FIGURE 1. Thus on energization of motor 138 the transverse conveyor 22 transfers extrusions passed thereto from the stretcher 18 to the saw conveyor 24.

Saw conveyor 24 comprises a plurality of rollers 146 secured at opposite ends to the conveyor frame 150. The saw conveyor 24 also includes the endless belt 152 positioned centrally thereof adapted to frictionally engage extrusions on the rollers 146 when the bar 154 is in a down position. On movement of the bar 154 into the up position extrusions resting on rollers 146 will be moved out of engagement with the endless belt 152 whereby movement of the extrusions axially of the conveyor 24 will be stopped.

An adjustable stop 156 is provided on the saw end 157 of the saw conveyor 24 whereby the extrusions are measured to the correct length before being cut by saw 26 on movement of the extrusions into engagement therewith.

Saw 26 moves transversely of the saw conveyor 24. Saw 26 is controlled by means of a separate switch 158 which when closed will cause the saw 26 to move through a complete cutting cycle at a desired speed. Such saws are known in the art and will therefore not be considered in detail herein.

As previously indicated the automatic extrusion handling equipment of the invention also includes a plurality of sensing elements for sensing the position of extrusions handled thereby and the position of the runout conveyor. The sensing elements are shown in their relation to the other elements of the extrusion handling equipment of the invention in FIGURE 6.

The sensing elements include a pair of photoelectric cells 160a and 160b and an energizing light 159 positioned in the extrusion path of the extrusion press 12 at the end 162 of runout conveyor 38. The photoelectric cells 160a and 160b are operable to sense the end of an extrusion from the press 12 and to sense twists, bends and other irregularities therein anywhere along the length thereof. The photoelectric cells 160a and 160b are positioned in vertical alignment, are connected in series and are operable to actuate contacts 160c of photoelectric relay 160 in control circuit 23 shown in FIGURE 7 only when both are energized. Thus the provision of a pair of photoelectric cells 160a and 160b in series serves to prevent a spurious indication that no extrusion extends between the press 12 and runout table 10 which might otherwise occur due to warping and twisting of extrusions as will become more apparent in the subsequent consideration of control circuit 23.

Photoelectric cell 164a and energizing light 166 therefor are positioned beneath the runout conveyor 38 and are diagonally related thereto. In operation the photoelectric cell 164a is energized by light 166 for only a predetermined time during the passing thereby of each individual section of conveyor 38 between channel members 46 due to shielding of the photoelectric cell 164a at other times. Only when the photoelectric cell 164a is energized is it possible to energize the kickover arm apparatus 20 as will become more evident subsequently.

Two other photoelectric cells 168a and 176a and their associated light sources 174 and 170 are provided to sense extrusions as they are moved by the automatic extrusion handling equipment.

The photoelectric cell 168a is oriented vertically at the stretcher side of the cooling rack 14 and is operable to sense the presence of an extrusion being moved by the walking beam apparatus 16 to the stretcher side of the cooling rack. The photoelectric cell 168a on sensing of an extrusion at the stretcher side of the cooling rack 14 operates a set of contacts in the control circuit 23 to stop the operation of the walking beam apparatus 16 as will become evident in the subsequent consideration of the control circuit 23.

Photoelectric cell 176a is oriented horizontally transversely of the saw conveyor 24. The photoelectric cell 176a is operable to sense the end of an extrusion as it is passed into position to be cut into desired lengths by the saw 26.

Limit switches 180, 182, 184, 186 and 178 are also provided in conjunction with the automatic extrusion handling equipment to sense the position of the runout conveyor 38, the two limiting positions of the kickover arms 78, the retracted position of the saw 26, and the presence of extrusions abutting stop 156 respectively. The operation of these limit switches will be more fully considered in the explanation of the control circuit 23.

The over-all operation of the automatic extrusion handling equipment will be considered in conjunction with the control circuit 23 shown in FIGURE 7. In considering the control circuit 23 operation in the manual mode will first be described. Mode of operation switches 187, 188, 190, 192, 194a and 194b will therefore be assumed to be in the off or central position thereof as illustrated in FIGURE 7 in contrast to the manual up or automatic down position thereof.

The main power on-off switch 196 will be assumed to be in the closed position which is the lower position thereof, as shown in FIGURE 7. The one hundred ten volt single phase sixty cycle secondary coil 198 of transformer 200 is energized from the four hundred forty volt primary coil 202 of the transformer 200 to provide an electric potential between conductors 201 and 203. Coil 202 is energized through circuit breaker 204 from the external three phase power leads 206.

The switch 187 is then moved to the up or manual position as shown in FIGURE 7. With the switch 187 in the up position and the kickover arms 78 in the position shown in FIGURE 1, wherein they are out of the way of the runout conveyor 38 and close contacts 184a of limit switch 184 to energize relay coil 208 to close contacts 208a, the relay coil 210 of magnetic starter 211 for runout conveyor motor 42 is energized through contacts 208a. The runout conveyor 38 is caused to advance by the energized motor 42 in a direction to move extrusions extruded from the extrusion press 12 away from the press 12.

It will be understood that the runout conveyor 38 is operated at a speed in excess of the extrusion speed of the press 12 whereby a positive tensile force is applied to extrusions during the extruding thereof by press 12 through frictional contact of the extrusions with the carbon blocks 50 on the runout conveyor 38. Further the mechanically applied tensile force is uniform and causes less movement of the extrusions relative to the runout conveyor than the prior hand runout operation on a carbon lined runout table so that more uniform extrusions and less scrap are produced using the mechanically applied uniform tensile force.

Also, it should be particularly noted that the runout conveyor 38 will not operate unless the kickover arms 78 are in a position to clear the runout conveyor 38 and close the contacts 184a of limit switch 184 due to the provision of the relay coil 208 and contacts 208a in the control circuit 23. Thus damage to the kickover arms 78 or runout conveyor 38 due to simultaneous operation thereof is prevented.

After an extrusion has been run out on runout conveyor 38 the switch 187 is reutrned to the position shown in FIGURE 7 whereby the magnetic starter 211 is deenergized and conveyor 38 is stopped. Push button switch 212 is then manually closed to energize the relay coil 214 of the magnetic starter 215 for starting the motor 88 of the kickover arm apparatus 20 to swing the kickover arms 78 in an arcuate path over the conveyor 38. The extrusion is thus wiped from the runout conveyor 38 onto the cooling rack 14 by contact with carbon blocks 84 of the kickover arms 78.

Magnetic starter 215 is energized through contacts 210a of magnetic starter relay coil 210, contacts 164b of photoelectric cell relay 164, contacts 216a of magnetic starter relay coil 216 and contacts 218a of relay 218. Contacts 210a insure that the kickover arms 78 will not be moved over runout conveyor 38 while the conveyor motor 42 is energized since the contacts 210a are open any time the magnetic starter 211 is energized. Contacts 164b prevent moving the kickover arms 78 over the runout conveyor 38 at any time the runout conveyor has been stopped in a position as sensed by the photoelectric cell 164a wherein the kickover arms 78 would engage a portion of the runout conveyor 38 during such movement thereof. Contacts 164b are closed when relay 164 is energized due to light from light source 166 falling on photoelectric cell 164a.

Contacts 216a are provided to prevent operation of both the magnetic starters 215 and 217 simultaneously. Contacts 216a will be closed only when magnetic starter relay coil 216 is not energized.

Contacts 218a will be closed when time delay relay 218 is not energized. Relay 218 will be energized only after the kickover arms 78 have reached their limit of movement over conveyor 38 and have closed the contacts 182a of limit switch 182. The relay 218 is provided to prevent oscillation of the kickover arms 78 which would otherwise occur during automatic operation as will become more evident subsequently.

Manually operated push button switch 212 is held in the closed positon until the circuit through the magnetic starter relay coil 214 is broken due to closing of the contacts 182a to energize the relay 218 and open the contacts 218a. During this period the kickover arms 78 will swing arcuately out over the runout conveyor 38 until they are at approximately one hundred fifteen degrees to the position shown in FIGURE 1 due to operation of motor 42 whereby any extrusion on runout conveyor 38 will be contacted by the carbon blocks 84 and transferred to the cooling rack 14 thereby.

The kickover arm manual push button switch 220 is then closed whereby the magnetic starter relay coil 216 is energized through contacts 210a and 164b previously considered and contacts 214a and 184b. As previously indicated contacts 214a will be closed any time the magnetic starter relay coil 214 is deenergized. The contacts 184b of limit switch 184 will be closed any time the kickover arms 78 are in any position except the position shown in FIGURE 1.

Thus it will be evident that the magnetic starter 217 energized by magnetic starter relay coil 216 will remain energized while the manual push button switch 220 is depressed to energize motor 88 in a direction to cause reverse arcuate swinging of the kickover arms 78 until the kickover arms 78 reach the position shown in FIGURE 1. When the kickover arms 78 reach the position shown in FIG. 1 the contacts 184b of the limit switch 184 are opened, breaking the circuit through magnetic starter relay coil 216.

Extrusions deposited on the cooling rack 14 may be moved from the runout conveyor side of the cooling rack to the stretcher side of the cooling rack by means of the walking beam apparatus 16 on moving mode of operation switch 190 to the up or manual position to energize magnetic starter relay coil 224 and therefore magnetic starter 223 to cause operation of the walking beam apparatus drive motor 126. Switch 190 is returned to the position shown in FIGURE 7 on approach of an extrusion to the stretcher side of the walking beam apparatus 16 to stop the operation of the motor 126.

One of the three manual push button switches 228a, 228b and 228c is closed after moving switch 192 into the manual or up position to energize the magnetic starter relay coil 230 and magnetic starter 231 to cause operation of transverse conveyor drive motor 138 when it is desired to move extrusions from the stretcher end of the transverse conveyor to the saw conveyor end thereof. The closed switch 228a, 228b or 228c is released to stop the operation of the transverse conveyor 22. Switch 228a is located on the control panel 234 while switch 228b is located adjacent the front clamping head 112 of the stretcher 18, and the switch 228c is located at the saw end of saw conveyor 24. The position of the three differently located switches 228a, 228b and 228c is of course for convenience only.

Advance of extrusions deposited on the saw conveyor 24 from the transverse conveyor 22 in manual operation is accomplished by moving switch 194a into the manual or up position and then closing the manually operated push button switch 236 to complete an electric circuit through the magnetic starter relay coil 238 to energize magnetic starter 239 and start the drive motor 240 of the portion 152 of the saw conveyor 24. Release of the push button 236 of course deenergizes the magnetic starter 239 and therefore the motor 240.

At this point it should be pointed out that in both manual and automatic modes of operation of the automatic extrusion handling equipment that means are provided to facilitate the movement of extrusions from the transverse conveyor to the saw conveyor over the rough rubberoid surface of conveyor portion 152. The rough surface is necessary on conveyor portion 152 in order to pull the extrusions down the length of the conveyor when desired, but makes it almost impossible to drag extrusions over it with any sort of uniformity.

Thus photoelectric relay 176 is energized through photoelectric cell 176a when the end of the prior group of extrusions passes the photoelectric cell to close relay contacts 176b to energize relay coil 243 and close relay contacts 243a whereby the solenoid 241 is energized when motor 138 is energized. Solenoid 241 is effective to raise the bar 154 to receive the tail end of a group of extrusions from the transverse conveyor as they are transferred to the saw conveyor 24 and maintain them above the conveyor portion 152.

Solenoid 241 is therefore provided to facilitate the sporatic transferring of extrusions from the transfer conveyor to the saw conveyor. Relay coil 243 is provided to prevent the lift bar 154 from being driven into the bottom of extrusions previously deposited on the saw conveyor 24 and damaging the extrusions or saw.

On opening of switch 192, or switches 228a, 228b and 228c the extrusions will be lowered onto conveyor portion 152 and moved thereby in the path of the light beam between the photoelectric cell 176a and light source 170 and into engagement with adjustable stop 156. After the extrusions have been driven by saw conveyor 24 into engagement with the adjustable stop 156 they are in position for cutting by the saw 26.

Saw 26 may then be operated in the usual manner by closing and releasing the control switch 158 whereby the saw 26 is caused to advance transversely of the saw conveyor and cut extrusions on the saw conveyor 24 in the path thereof and to then return to a position out of the way of the saw conveyor 24. Limit switch 186 is open with the saw 26 in the out of the way position shown in FIGURE 6. The saw control circuit and motor 242 are well known and therefore have not been illustrated and will not be considered in detail. It will be understood however, that the saw performs a complete cutting cycle as a result of a single momentary actuation of the push button switch 158.

Briefly, the saw control circuit includes a four-way operating valve for an air actuated cylinder which cylinder includes a piston directly connected to the saw to produce movement of the saw in accordance with movement of the piston and an air operating switch for the four-way operating valve of the cylinder. A pair of air bleeder valves actuated by hand operable switch 158 and limit switch 159 connected to the advance and return sides of the air operating switch are further included in the saw control circuit.

In manual operation when the switch 158 is closed the advance air bleeder valve is opened to upset the equilibrium of the air operating switch whereby the four-way operating valve meters air to the saw actuating cylinder and the cylinder piston and saw are moved forward to cause cutting of the extrusions. Even though switch 158 is released after an initial unbalance the air operating switch will meter air to the saw actuating cylinder until the limit switch 159 is actuated by the saw 26 in its fully out position. On actuation of the limit switch 159 the return bleeder valve is opened to create an unbalance in the air operating switch to cause return of the saw 26 to its fully out of the way position wherein switch 186 is actuated. The unbalance of the air operating switch may then be again accomplished by closing switch 158 to repeat the cutting cycle of the saw.

A closed circuit hydraulic cylinder, piston and restricted flow line between the ends of the hydraulic cylinder are also provided as part of the saw control circuit. The piston of the hydraulic cylinder is also connected directly to the saw 26 and serves to provide uniform actuation of the saw 26 by the pneumatic cylinder and controls.

In the automatic mode of operation of the extrusion handling equipment with the switches 187, 188, 190 and 192 in the automatic or down position the main switch 196 is closed. The magnetic starter relay coil 210 is thus energized through the relay contacts 208a as before when the kickover arms are in the position shown in FIGURE 1, through the switch 187 and the contacts 248a of relay 248 and contacts 160c of photoelectric relay 160.

The runout conveyor 38 will continue to run until the tail end of an extrusion from the extrusion press 12 is sensed by the photoelectric cells 160a and 160b of photoelectric relay 160 at which time relay contacts 160c will be opened. Magnetic starter relay coil 210 will then be deenergized upon opening of the relay contacts 248a due to energizing of the relay 248 which on receiving a pulse of electric energy therethrough will remain energized for approximately three seconds.

As shown in the control circuit 23 the relay 248 will be energized when relay contacts 250a, 250b and limit switch contacts 180a are simultaneously closed. Limit switch contacts 180a are closed by contact of the limit switch 180 with projections on the runout conveyor 38 when the conveyor 38 is in a safety zone or position wherein the kickover arms 78 may be swung arcuately over the conveyor 38 to push an extrusion therefrom without contacting conveyor 38.

Relay contacts 250a will be closed immediately upon energization of the time delay relay 250 while the relay contacts 250b will be opened approximately 1.2 seconds after the time delay relay 250 is energized. Thus for a period of 1.2 seconds after the end of an extrusion is sensed the runout conveyor is prepared for stopping on engaging of the limit switch 180 by the runout conveyor 38. This period is sufficient to insure engagement of limit switch 180 at any runout conveyor speed.

Relay 250 is energized on closing of relay contacts 252a. Relay contacts 252a are closed .8 of a second to 1.2 seconds after the relay 252 has been energized. Energizing relay 252 only after .8 to 1.2 seconds in accordance with the speed of runout conveyor 38 prevents undesired energizing of relay 248 due to double tripping of photocells 160a and 160b by possible false signals created by spurious action of extrusions in twisting or jumping momentarily out of light beam. Relay 252 is energized through contacts 254a on the energization of relay 254. Relay 254 is energized by closing of contacts 160d.

Thus it will be seen that after the photoelectric relay 160 is energized to open the contacts 160c and close the cntacts 160d, that the contacts 248a will be opened to stop the movement of the runout conveyor 38 after energizing relays 252 and 250 in order and subsequently actuating limit switch 180 to close contacts 180a, so that the conveyor 38 is stopped in a predetermined relation to the kickover arms 78 wherein interference of the conveyor 38 with the kickover arms 78 on outward swinging thereof is prevented.

With the conveyor 38 stopped in the predetermined relation to the conveyor kickover arms 78 the relay contacts 210a which are open when the magnetic starter relay coil 210 is energized are closed whereby the magnetic starter relay coil 214 is energized through the photoelectric relay contacts 164b, magnetic starter relay contacts 216a and relay contacts 218a as indicated in the consideration of the manual mode of operation of the extrusion handling equipment and through relay contacts 254b and 248b.

Contacts 254b are closed any time the photoelectric cells 160a and 160b sense the end of an extrusion from extrusion press 12 so that relay 160 is energized as previously indicated. Relay contacts 248b are closed any time the relay 248 is energized, which as previously considered will be for approximately three seconds when the photoelectric cells 160a and 160b sense the end of an extrusion from the press 12 and energize the photoelectric cell relay 160, and the relay contacts 180a are closed to stop the conveyor in a safe zone.

Kickover arms 78 will then swing through their arcuate path to transfer the extrusion from the runout conveyor 38 to the cooling rack 14. On the kickover arms reaching their limiting position over the runout conveyor 38 the limit switch 182 is engaged by a kickover arm 78 and contacts 182a thereof are closed, energizing relay 218 so that relay contacts 218a are caused to open whereby magnetic starter relay 214 and magnetic starter 215 are deenergized and the outward swinging of the kickover arms 78 is stopped.

Contacts 214a of magnetic starter relay 214 are permitted to close and for from three and one-half to four seconds after closing of contacts 182a of limit switch 182 due to relay 218 which maintains relay 218 energized after opening of limit switch 182, the magnetic starter relay coil 216 is energized through limit switch contacts 184b which are closed when the kickover arms are in any position except the position shown in FIGURE 1. The kickover arms will therefore move back to the position shown in FIGURE 1 at which time the kickover arms will engage limit switch 184 breaking the circuit through magnetic starter relay coil 216 upon opening contacts 184b to deenergize magnetic starter 217 and motor 88.

Thus, it will be seen that for operation of the kickover arm apparatus 20, three distinct conditions must exist. First, the runout conveyor 38 must not be operating; second, the runout conveyor 38 must be stopped in a safe zone as determined by the photoelectric cell 164a; and third, the photoelectric cells 160a and 160b must sense the end of an extrusion. In addition, the magnetic starter contacts 214a and 216a are provided as a safety feature to prevent attempting to operate the kickover arm apparatus motor 88 in opposite directions at the same time. A mechanical interlocking of the relay contacts is also provided for the same purpose.

In addition, it is undesirable to attempt to transfer extrusions from the runout conveyor 38 to the cooling rack 14 while the walking beam apparatus 16 is in operation. Thus, relay contacts 208b are provided in the energizing circuit of the magnetic starter 224 for the walking beam apparatus 16 in the automatic mode of operation. The contacts 208b are open at any time the kickover arms 78 are not in the position thereof shown in FIGURE 1. In addition, contacts 168a of the photoelectric relay 168 are connected in series with the contacts 208b to prevent operation of the walking beam apparatus 16 in the automatic mode when an extrusion on cooling rack 14 approaches the stretcher side of the cooling rack.

The make before break switch 255 operable on movement of the walking beam apparatus 16 is therefore connected in control circuit 23 so as to be in series with relay contacts 208b and 168a as shown in FIGURE 7 when the walking beam apparatus 16 is in the lower position thereof. Thus, if the kickover arms are not in the position shown in FIGURE 1, or if the photoelectric relay 168 is energized, the energizing circuit through the magnetic starter relay coil 224 will be broken with the walking beam apparatus 16 in the down position. Therefore, in the automatic mode of operation of the extrusion handling equipment the walking beam apparatus 16 will be caused to operate unless an extrusion is present at the stretcher 18 or the kickover arms are in position over runout conveyor 38.

In the automatic mode of operation the transverse conveyor 22 is operated in the same manner as in the manual mode of operation. That is, the transverse conveyor 22 is caused to move extrusions from the stretcher end thereof to the saw conveyor end thereof on pressing of push button 228a, 228b or 228c.

The operation of the saw conveyor in the automatic mode is actually started with the switches 194a and 194b in the manual position. With the switches 194a and 194b in the manual position, the solenoid 258 operable on energization to close switch 158 to start an automatic saw head cutting cycle is completely out of the circuit, and the magnetic starter relay coil 238, which controls the saw conveyor, will be energized only when the manual push switch 236 is depressed. As soon as the spring loaded switch 236 is released, the circuit through magnetic starter relay coil 238 will be broken and the saw conveyor stopped. With this condition existing switch 236 is depressed to energize magnetic starter 239, and advance extrusions on the saw conveyor 24 toward the end 157 thereof until the reject material at the tail end of the extrusions has just barely passed the saw blade. At this instant, switch 236 is released, immediately deenergizing magnetic starter 239 and stopping the saw conveyor 24.

With switches 194a and 194b still in the manual position, the switch 158 is depressed only momentarily, and as soon as it is released, the saw head will be in process of its automatic cutting cycle. As soon as switch 158 is released, the switches 194a and 194b are turned to the automatic position. There is no material abutting the stop 156 at this time however and the contacts 178b are open whereby solenoid 258 is deenergized. The saw 26 is now in a position over conveyor 24 whereby switch 186 is open holding magnetic starter 232 deenergized. The saw 26 will continue with its cutting cycle until it is again fully retracted. While the saw 26 is in the return phase of its cycle, the tail end scrap which has just been cut off the extrusions is removed from the saw conveyor and discarded.

As soon as the saw 26 reaches the fully retracted position, it closes switch 186. At this time, there is still no extrusion depressing switch 178 at the stop 156; therefore contacts 178a are in the closed position holding the relay coil 256 energized. Consequently the contacts 256a are in the closed position. At the same time, the light beam for photoelectric cell 176 is held broken so that no light contacts photoelectric cell 176a; therefore, photoelectric cell relay contact 176b remains open holding coil 243 deenergized, which results in relay contact 243b remaining in the normally closed position. These conditions existing, the coil 238 of magnetic starter 239 is energized through contact 243b and 256a and switches 186 and 194a, and the saw conveyor will run to advance the extrusions 24 until such time as the end of the extrusions engage the hinge leaf switch 178 mounted at the stop 156.

Switch 178 being fully depressed will close contacts 178b and open contacts 178a. When contacts 178a open, the relay coil 256 is deenergized; however, this timing relay is set for approximately a two-second delay after deenergization; therefore, the contacts 256a will remain closed for this interval. The reason for this being that in case the momentum of the extrusion hitting the stop 156 causes them to bounce back by even one-eighth inch that a continued two-second operation of the saw conveyor will again carry the extrusions forward into full contact with the switch 178 and stop 156, but this time with less momentum because the short travel involved will not allow the conveyor to reach as high a speed. At the end of the two-second interval, relay coil 256 will be deenergized which immediately opens contacts 256a deenergizing magnetic starter 239 and instantly stopping the saw conveyor which may not now be started again in the automatic cycle until contacts 178a are again closed.

While the saw conveyor 24 was running and the timing relay 256 was energized, the relay coil 252 was energized through contact 256a, switch 186, and switch 194a. This coil being energized resulted in the contacts 262a being closed, therefore, energizing the relay coil 250 and closing contacts 250a. At this time, the solenoid 258 cannot be energized until the extrusions have been advanced to depress switch 178 and close contacts 178b. Also the auxiliary contacts 238a remain open so long as magnetic starter 239 is engergized, causing the saw conveyor 24 to operate.

When the extrusions have been advanced as described above so as to result in contacts 250a opening and deenergizing magnetic starter 239, auxiliary contacts 238a instantly close. Secondly, the coil 262 is instantly deenergizing which opens contacts 262a deenergizing timing relay coil 260. Timing relay coil 260 is set for approximately a one-second delay after deenergizing. Therefore, contacts 260a will remain closed for this interval, and for this one-second interval, the proper conditions will exist to energize the solenoid 258 through contacts 238a, 178b and 260a and switch 194b. The one-second energization of solenoid 258 will set into operation the pneumatic cycle of the saw 26 previously described in the manual mode of operation. When this pneumatic cycle has been completed and the saw 26 again reaches its fully retracted position, the switch 186 will again be closed and the saw 26 will not cycle again because solenoid 258 has been deenergized by contacts 260a opening.

The saw conveyor 24 will not run at this time because magnetic starter 239 remains deenergized by contacts 256a remaining open. This static condition will continue to exist until such time as the sections cut from the extrusions are removed from the end 157 of the saw conveyor 24. Only when the last extrusion section has been completely cleared of the saw conveyor will the hinge leaf switch 178 be released. This is insured by the fact that switch 178 is hinged at the back side of the stop 156 so that any one piece of the extrusions left on the saw conveyor will continue to hold the switch in the depressed condition.

As soon as the last piece of material has been removed from the end 157 of the saw conveyor 24, the hinge leaf switch 178 will be released instantly opening contacts 178b to prevent the saw 26 from operating and simultaneously closing contacts 178a, energizing relay coil 256, closing contact 256a, starting magnetic starter 239 to thereby cause the conveyor 24 to again advance the extrusions. This cyclic operation will continue until the lead end of the extrusion is reached.

Relay coil 262 has approximately a one-second delay after energizing in the operation just described. This insures that magnetic starter 239 will be energized before contacts 260a are closed which insures that the saw conveyor 24 will operate to advance material before solenoid 258 is energized to cycle the saw 26. Once magnetic starter 239 has been energized to start the conveyor, auxiliary contacts 238a will instantly open and remain open for so long as the conveyor operates.

When the lead end of the extrusion passes the photoelectric cell 176a and light source 170, the light beam will no longer be interrupted, and the light source will energize the photoelectric cell energizing photoelectric cell relay 176, closing contacts 176b, energizing relay coil 243, opening contacts 243b, deenergizing magnetic starter 239 and therefore, stopping the saw conveyor 24. Although magnetic starter 239 has been deenergized closing auxiliary contacts 238a, solenoid 258 will still not be energized to cycle the saw 26 unless the last piece of extrusion is long enough to have depressed and held depressed switch 178, causing contacts 178b to close, therefore, completing the operation in a normal automatic manner.

If the last piece of extrusion is too short to depress switch 178, then the saw conveyor merely stops without the saw head operating since contacts 178b would remain open. This static condition will continue to exist until the saw operator returns switches 194a and 194b to the hand position and uses the manual controls to operate the saw conveyor 24 and saw 26, in order to obtain the most economic alternate cut length which would be shorter than the pre-set standard cut length. Packers then remove this alternate cut length from the end 157 of the saw 26 and the lead end scrap from the other side of the saw to complete the automatic cycle of operation of the extrusion handling apparatus.

The drawings and the foregoing specification constitute a description of the improved automatic extrusion handling equipment in such full, clear, concise and exact tearms as to enable any person skilled in the art to practice the invention, the scope of which is indicated by the appended claims.

What I claim as my invention is:

1. Automatic extrusion handling equipment comprising a runout conveyor onto which extrusions are extruded, a cooling rack positioned adjacent the runout conveyor for receiving extrusions therefrom, mechanical means operably associated with the runout conveyor and cooling rack for automatically transferring extrusions from the runout conveyor to the cooling rack, walking beam apparatus operably associated with the cooling rack for transferring the extrusions from one side of the cooling rack to the other, an extrusion stretcher, one side of which is positioned adjacent said other side of the cooling rack, a transverse conveyor, one end of which is located adjacent the other side of the extrusion stretcher for moving stretched extrusions away from the extrusion stretcher, a saw conveyor positioned at the other end of the transverse conveyor operable to receive extrusions from the transverse conveyor and to move the extrusions longitudinally into position for cutting, and a saw operably associated with said saw conveyor for cutting the extrusions into predetermined lengths.

2. Automatic extrusion handling equipment comprising a runout conveyor onto which extrusions are extruded, a cooling rack positioned adjacent the runout conveyor for receiving extrusions therefrom mechanical means operably associated with the runout conveyor and cooling rack for automatically transferring extrusions from the runout conveyor to the cooling rack, walking beam apparatus operably associated with the cooling rack for transferring the extrusions from one side of the cooling rack to the other, an extrusion stretcher, one side of which is positioned adjacent said other side of the cooling rack, a transverse conveyor, one end of which is located adjacent the other side of the extrusion stretcher for moving stretched extrusions away from the extrusion stretcher, a saw conveyor positioned at the other end of the transverse conveyor operable to receive extrusions from the transverse conveyor and to move the extrusions longitudinally into position for cutting, a saw operably associated with said saw conveyor for cutting the extrusions into predetermined lengths, and an electric circuit operably associated with the extrusions handling equipment structure for controlling the operation thereof.

3. Automatic extrusion handling equipment comprising a runout conveyor onto which extrusions are extruded, a cooling rack positioned adjacent the runout conveyor for receiving extrusions therefrom, mechanical means operably associated with the runout conveyor and cooling racks for automatically transferring extrusions from the runout conveyor to the cooling rack, walking beam apparatus operably associated with the cooling rack for transferring the extrusions from one side of the cooling rack to the other, an extrusion stretcher, one side of which is positioned adjacent said other side of the cooling rack, a transverse conveyor, one end of which is located adjacent the other side of the extrusion stretcher for moving stretched extrusions away from the extrusion stretcher, a saw conveyor positioned at the other end of the transverse conveyor operable to receive extrusions from the transverse conveyor and to move the extrusions longitudinally into position for cutting a saw operably associated with said saw conveyor for cutting the extrusions into predetermined lengths, and an electric control circuit operable in either manual or automatic modes associated with said runout conveyor, mechanical means, walking beam apparatus, transverse conveyor, saw conveyor and saw for sensing the position of the extrusions on the runout conveyor, mechanical means, walking beam apparatus and saw and controlling the operation of the conveyors, mechanical means, walking beam apparatus and saw in accordance therewith.

4. Structure as set forth in claim 3 wherein the transverse conveyor comprises a pair of parallel spaced apart shafts having belt sprockets aligned transversely thereof spaced intermittently therealong, endless belts extending between the aligned belt sprockets and means for rotating one of said shafts.

5. Structure as set forth in claim 3 wherein the saw conveyor comprises a pair of elongated parallel support frames, a plurality of rollers extending transversely between the elongated support frames and means rotatably mounting the ends of the rollers on the support frames, belt sprockets extending substantially parallel to the rollers in spaced relation to each other axially of the saw conveyor located centrally of the saw conveyor, an endless belt of high friction material positioned on the belt sprockets and means for rotating one of the sprockets.

6. Structure as set forth in claim 3 wherein the control circuit includes means for sensing the end of extrusions extruded onto the runout conveyor.

7. Structure as set forth in claim 3 wherein the control circuit includes means for controlling the position at which the runout conveyor stops relative to the mechanical transfer means.

8. Structure as set forth in claim 3 wherein the control circuit includes means for sensing the relative position between the runout conveyor and mechanical transfer means.

9. Structure as set forth in claim 3 wherein the control circuit includes means for stopping the walking beam in a lowered position at any time the transfer means is in position over the runout conveyor and when an extrusion is present at the side of the cooling rack remote from the runout conveyor.

10. Structure as set forth in claim 3 wherein the control circuit includes means for sensing the end of a first group of extrusions on the saw conveyor and structure for preventing movement of a second group of extrusions into contact with the sensed ends of the first group of extrusions.

11. Structure as set forth in claim 3 wherein the control circuit includes means for preventing operation of the saw when extrusions are not in position against the end of the saw conveyor.

12. Automatic extrusion handling equipment comprising a runout conveyor onto which extrusions are extruded, a cooling rack positioned adjacent the runout conveyor for receiving extrusions therefrom, mechanical means operably associated with the runout conveyor and cooling rack for automatically transferring extrusions from the runout conveyor to the cooling rack, walking beam apparatus operably associated with the cooling rack for transferring the extrusions from one side of the cooling rack to the other, an extrusion stretcher, one side of which is positioned adjacent said other side of the cooling rack, a transverse conveyor, one end of which is located adjacent the other side of the extrusion stretcher for moving stretched extrusions away from the extrusion stretcher and a saw conveyor positioned at the other end of the transverse conveyor operable to receive extrusions from the transverse conveyor and to move the extrusions longitudinally into position for cutting.

13. Automatic extrusion handling equipment comprising a runout conveyor onto which extrusions are extruded, a cooling rack positioned adjacent the runout conveyor for receiving extrusions therefrom, mechanical means operably associated with the runout conveyor and cooling rack for automatically transferring extrusions from the runout conveyor to the cooling rack, walking beam apparatus operably associated with the cooling rack for transferring the extrusions from one side of the cooling rack to the other, an extrusion stretcher, one side of which is positioned adjacent said other side of the cooling rack and a transverse conveyor, one end of which is located adjacent the other side of the extrusion stretcher for moving stretched extrusions away from the extrusion stretcher.

14. Automatic extrusion handling equipment comprising a runout conveyor onto which extrusions are extruded, a cooling rack positioned adjacent the runout conveyor for receiving extrusions therefrom, mechanical means operably associated with the runout conveyor and cooling rack for automatically transferring extrusions from the runout conveyor to the cooling rack, walking beam apparatus operably associated with the cooling rack for transferring the extrusions from one side of the cooling rack to the other and an extrusion stretcher, one side of which is positioned adjacent said other side of the cooling rack for stretching extrusions received thereby from the cooling rack.

References Cited by the Examiner

UNITED STATES PATENTS

| | | | |
|---|---|---|---|
| 2,176,365 | 10/1939 | Skinner | 207—1 |
| 2,379,622 | 7/1945 | Butler | 72—257 |
| 2,830,700 | 4/1958 | Kamena | 72—257 |
| 2,914,170 | 11/1959 | Kent | 72—257 |
| 3,018,885 | 1/1962 | Trautman | 72—256 |
| 3,032,187 | 5/1962 | Hutch | 207—1 |
| 3,157,268 | 11/1964 | Anderson | 72—257 |

CHARLES W. LANHAM, *Primary Examiner.*

W. H. JUST, *Assistant Examiner.*